United States Patent

Asano et al.

[11] Patent Number: 6,037,402
[45] Date of Patent: Mar. 14, 2000

[54] GRANULAR POWDER OF FILLED POLYTETRAFLUOROETHYLENE AND PROCESS FOR THE PRODUCTION THEREOF

[75] Inventors: Michio Asano; Masamichi Sukegawa; Hirokazu Yukawa; Tetsuo Shimizu; Shoji Kawachi; Shingo Tanigawa; Masayuki Tsuji, all of Settsu, Japan

[73] Assignee: Daikin Industries, Ltd., Osaka, Japan

[21] Appl. No.: 09/051,908

[22] PCT Filed: Oct. 23, 1996

[86] PCT No.: PCT/JP96/03113

§ 371 Date: Apr. 24, 1998

§ 102(e) Date: Apr. 24, 1998

[87] PCT Pub. No.: WO97/15611

PCT Pub. Date: May 1, 1997

[30] Foreign Application Priority Data

Oct. 27, 1995 [JP] Japan ............................. 7-303590

[51] Int. Cl.[7] ........................................ C08L 27/12
[52] U.S. Cl. ........................ 524/545; 524/543; 524/544; 524/546
[58] Field of Search ........................ 524/543, 544, 524/545, 546

[56] References Cited

FOREIGN PATENT DOCUMENTS

| | | |
|---|---|---|
| 52-28552 | 3/1977 | Japan . |
| 52-38565 | 3/1977 | Japan . |
| 52-38857 | 10/1977 | Japan . |
| 53-47386 | 12/1978 | Japan . |
| 56-115326 | 9/1981 | Japan . |
| 60-21694 | 5/1985 | Japan . |
| 61-243851 | 10/1986 | Japan . |
| 3-255133 | 11/1991 | Japan . |
| 3-259925 | 11/1991 | Japan . |
| 7-252365 | 10/1995 | Japan . |
| 1 173 000 | 12/1969 | United Kingdom . |

*Primary Examiner*—Helen L. Pezzuto
*Attorney, Agent, or Firm*—Armstrong, Westerman, Hattori, McLeland & Naughton

[57] ABSTRACT

Filler-containing polytetrafluoroethylene granular powder, which has a large apparent density, a small average particle size and a narrow particle size distribution and a superior powder flowability, and gives a molded product having a superior tensile strength, elongation and surface roughness, and a process for preparing the same. The granular powder is granulated by mixing, in water, of a PTFE powder and a filler in the state of slurry in the presence of a surfactant and stirring in the presence of an organic liquid forming liquid-liquid interface with water.

15 Claims, 7 Drawing Sheets

GRANULAR POWDER OF FILLED POLYTETRAFLUOROETHYLENE AND PROCESS FOR THE PRODUCTION THEREOF

TECHNICAL FIELD

The present invention relates to a filler-containing polytetrafluoroethylene granular powder and a preparation process thereof.

BACKGROUND ART

Hitherto, a process for preparing a filler-containing polytetrafluoroethylene (PTFE) granular powder by granulating a mixture of a filler and a PTFE powder with stirring in water was proposed, for example, in JP-B-8611/1968, JP-B-22619/1969, JP-B-37576/1973, JP-B-17855/1974, JP-B-8044/1981, JP-B-18730/1982, etc.

However, by the process for preparation disclosed in each of the above-mentioned patent publications, a filler-containing PTFE granular powder having a small particle size and a narrow particle size distribution could not be obtained.

For that reason, in case of preparing, for example, small articles such as seal rings in the form of a rubber band, thin moldings and molded products having a small surface roughness, there was a problem such that complicated and uneconomical steps must be employed, such as step of sieving a filler-containing PTFE granular powder to take out only particles of small size and molding them, or step of cutting the obtained molding.

Also a granular powder having excellent powder flowability cannot be obtained by only pulverizing a filler-containing PTFE granular powder.

In JP-B-21694/1985, there was proposed a process for preparing a filler-containing PTFE granular powder by granulating, with stirring in water, a PTFE powder and a filler which has been previously surface-treated with an aminosilane compound in coexistence with a water-insoluble organic liquid and an anionic surfactant. However, an apparent density of the filler-containing PTFE granular powder and tensile strength of molded products obtained therefrom are not fully satisfactory.

Further, in the preparation process as mentioned above, there were problems that long steps are employed, a complicated step of pre-mixing the filler and the PTFE powder is required and cost is high.

The present inventors have made intensive studies in view of the above-mentioned problems, and as a result, have found that those problems can be solved by mixing the PTFE powder and the filler in water in the state of slurry in the presence of a surfactant and further granulating the mixture in the presence of an organic liquid which forms liquid-liquid interface with water, with stirring.

Namely, an object of the present invention is to provide a filler-containing PTFE granular powder having a good processability and a process for preparation thereof. Particularly an object of the present invention is to provide a filler-containing PTFE granular powder having a large apparent density, a small average particle size, a narrow particle size distribution and good physical properties such as powder flowability, which gives molded products having excellent physical properties such as elongation, and a process for preparation thereof.

DISCLOSURE OF THE INVENTION

The present invention relates to a process for preparing a filler-containing polytetrafluoroethylene granular powder which is characterized in that a polytetrafluoroethylene powder prepared through suspension polymerization and a filler are poured separately in water without being pre-mixed, are mixed with stirring in the presence of a surfactant to give a slurry and then are granulated with stirring in the presence of an organic liquid which forms liquid-liquid interface with water.

The present invention also relates to a process for preparing a filler-containing polytetrafluoroethylene granular powder which is characterized in that a polytetrafluoroethylene powder prepared through suspension polymerization is poured in water and stirred in the presence of a surfactant to give a slurry and then after a filler is added and mixed to the slurry, the mixture is granulated with stirring in the presence of an organic liquid which forms liquid-liquid interface with water.

The present invention also relates to a process for preparing a filler-containing polytetrafluoroethylene granular powder which is characterized in that a water-containing powder of polytetrafluoroethylene after suspension-polymerized is wet-pulverized without being subjected to drying, poured in water, stirred in the presence of a surfactant to give a slurry and then after a filler is added and mixed to the slurry, is granulated with stirring in the presence of an organic liquid which forms liquid-liquid interface with water.

The present invention also relates to a filler-containing PTFE granular powder obtainable by any one of the above-mentioned processes, in which an apparent density of the powder is not less than 0.6 g/cm$^3$, flowability (to be defined hereinafter) of the powder is not less than 6 times and when an apparent density (d) is $0.6 \leq d < 0.9$, $0.9 \leq d < 1.0$ and $1.0 \leq d$, an angle of repose is not more than 40 degrees, not more than 38 degrees and not more than 36 degrees, respectively and an average particle size is not more than 500 μm.

BEST MODE FOR CARRYING OUT THE INVENTION

The preparation processes of the present invention have a major feature that the PTFE powder (A water-containing PTFE powder is included unless otherwise noted hereinafter) and the filler are mixed with stirring in water in the state of slurry in the presence of a surfactant, and no complicated step of pre-mixing the PTFE powder and the filler like a conventional process is required.

Namely, the preparation processes of the present invention are (1) a process for preparing a filler-containing polytetrafluoroethylene granular powder which is characterized in that a polytetrafluoroethylene powder prepared through suspension polymerization and a filler are poured separately in water without being pre-mixed, are mixed with stirring in the presence of a surfactant to give a slurry and then are granulated with stirring in the presence of an organic liquid which forms liquid-liquid interface with water (hereinafter referred to as "preparation process (1)"), (2) a process for preparing a filler-containing polytetrafluoroethylene granular powder which is characterized in that a polytetrafluoroethylene powder prepared through suspension polymerization is poured in water and stirred in the presence of a surfactant to give a slurry and then after a filler is added and mixed to the slurry, the mixture is granulated with stirring in the presence of an organic liquid which forms liquid-liquid interface with water (hereinafter referred to as "preparation process (2)"), and (3) a process for preparing a filler-containing polytetrafluoroethylene granular powder which is characterized in that a water-containing powder of polytetrafluoroethylene after suspension-polymerized is wet-pulverized without being subjected to drying, poured in water, stirred in the presence of a surfactant to give a slurry and then after a filler is added and mixed to the slurry, is granulated with stirring in the presence of an organic liquid which forms liquid-liquid interface with water (hereinafter referred to as "preparation process (3)").

In the above-mentioned preparation process (1), it is not necessary to pre-mix the PTFE powder and the filler, and as a method of pouring them in water, for example, there are a method of pouring the PTFE powder previously, a method of pouring the filler previously and a method of pouring them simultaneously.

In the preparation process (1), by pouring the PTFE powder and the filler in water, adding the surfactant and then stirring, the PTFE powder and the filler get wet with water and continuation of the stirring results in the state of a uniform mixture of the PTFE powder, filler and water, that is, in the state of slurry which is usually a viscous mixture having a viscosity of 10 to 1,000 cps.

After the mixture became in the state of the slurry, though by adding the organic liquid forming liquid-liquid interface with water and then stirring, the granulation is started in the droplets of the organic liquid (hereinafter referred to as "granulation in water"), the droplets can maintain the state of being smaller and more approximate to a spherical form because of functioning of a surfactant already being present therein.

In the above-mentioned preparation process (2), by pouring the PTFE powder in water and then adding a surfactant thereto, the PTFE powder gets wet with water, and by stirring, a uniform mixture with water in the state of slurry is obtained. Further, by pouring the filler and then stirring, a uniform mixture of the PTFE powder, filler and water (a viscous mixture having a viscosity of 10 to 1,000 cps) can be obtained.

After the addition of the filler, the granulation in water may be carried out in the same manner as in the preparation process (1).

In the above-mentioned preparation process (3), as mentioned hereinbelow, by wet-pulverizing the water-containing PTFE powder without being subjected to drying, pouring the wet-pulverized powder in water, adding a surfactant thereto and then starting the stirring, the mixture becomes in the state of slurry. Then by adding the filler in the same manner as in the preparation process (2), a uniform mixture of the PTFE powder and the filler can be obtained.

After the addition of the filler, the granulation in water may be carried out in the same manner as in the preparation process (1).

In the preparation processes of the present invention, the surfactant may be added to water previously.

The PTFE powder used in the present invention is prepared by usual suspension polymerization, and preferable is, for example, a powder comprising homopolymer of tetrafluoroethylene (TFE) or a copolymer of TFE and a monomer copolymerizable with TFE. An average particle size after the pulverization is not larger than 200 μm, preferably not larger than 50 μm, and a lower limit thereof is defined by a pulverizing apparatus and pulverizing technique. There is exemplified a powder having a water content of not more than 0.1% by weight, preferably not more than 0.02% by weight after the drying.

Examples of a pulverizing machine used in the above-mentioned pulverization are, for instance, a hammer mill, crusher equipped with a rotor having blades, jet mill and impact mill.

Also in the present invention, as the PTFE powder, there can be used a water-containing PTFE powder, for example, one having an average particle size of 200 to 1,000 μm and a water content of 5 to 30% by weight and prepared by pre-pulverizing, for instance, by means of a pipe line homomixer, coarse PTFE particles having an average particle size of 2 to 3 mm, which were prepared through the same suspension polymerization as in the above-mentioned PTFE powder and taken out of the polymerization system. The so-prepared water-containing PTFE powder is poured in the JIYU mill mentioned hereinbelow and wet-pulverized under the conditions of motor power of 2.2 kW and a capacity of 1.0 to 100 kg/hr by using a screen having plural holes of 0.1 to 0.3 mm diameter as a perforated panel, and thus, a powder having an average particle size of 20 to 100 μm and a water content of 5 to 30% by weight is obtained. When the thus obtained water-containing powder is used, the drying step required for obtaining the above-mentioned PTFE powder is not necessary.

As the monomer copolymerizable with TFE, there are, for example, a per(fluoro vinyl ether) represented by the formula (I):

$$CF_2=CF-OR_f \qquad (I)$$

wherein $R_f$ is a perfluoroalkyl group having 1 to 10 carbon atoms, a perfluoro(alkoxyalkyl) group having 4 to 9 carbon atoms, an organic group represented by the formula (II):

(II)

in which m is 0 or an integer of 1 to 4, or an organic group represented by the formula (III):

(III)

in which n is an integer of 1 to 4, and the like.

The number of carbon atoms of the above-mentioned perfluoroalkyl group is from 1 to 10, preferably from 1 to 5. When the number of carbon atoms is within the above-mentioned range, an excellent creep resistance can be obtained with maintaining the property of being not-meltprocessable.

As the above-mentioned perfluoroalkyl group, there are, for example, perfluoromethyl, perfluoroethyl, perfluoropropyl, perfluorobutyl, perfluoropentyl, perfluorohexyl and the like. From the viewpoint of creep resistance and cost of monomer, perfluoropropyl is preferable.

When a proportion of the monomer copolymerizable with TFE is within the range of 1.0 to 0.001% by mole, an excellent creep resistance can be obtained.

The use of the above-mentioned PTFE powder or water-containing PTFE powder having the average particle size in the above-mentioned range gives such effects that the granular powder obtained through granulation is easily handled, that is, having good powder flowability and an excellent apparent density, and in addition, the obtained molded articles have good physical properties.

Among the fillers used in the present invention, in case of a hydrophilic filler, there is a drawback such that the filler is easily transferred into a liquid phase due to its hydrophilic property and is difficult to be mixed with the PTFE powder homogeneously, that is, the agglomerated powder in which the whole of the filler used is mixed with the PTFE powder cannot be obtained and a part of the filler remains in the treating water. This phenomenon is so-called the separation of filler.

To cope with this problem, there is employed a method of previously surface-treating a hydrophilic filler for making it hydrophobic to lower its surface activity near the surface activity of the PTFE powder and stirring in water, or the like method.

As the compound known as one used for the above-mentioned surface treatment, there are (a) a functional amino-containing silane, a phenyl-containing silane, and/or a soluble silicone (JP-A-548/1976, JP-A-549/1976, JP-A-218534/1992), (b) a monocarboxylic acid of hydrocarbon having 12 to 20 carbon atoms (JP-B37576/1973), (c) a chromium complex compound of an aliphatic carboxylic acid (JP-B-37576/1973), (d) a silicone (JP-A-139660/1978), etc. and (e) a method of coating a hydrophilic filler with PTFE (JP-A-121417/1976) is also known.

More represented examples of the above-mentioned compound used for the surface treatement of the hydrophilic filler are, for instance, aminosilane coupling agents such as γ-aminopropyltriethoxysilane ($H_2N(CH_2)_3Si(OC_2H_5)_3$), m- or p-aminophenyltriethoxysilane ($H_2N-C_6H_4-Si(OC_2H_5)_3$), γ-ureidopropyltriethoxysilane ($H_2NCONH(CH_2)_3Si(OC_2H_5)_3$), N-(β-aminoethyl)-γ-aminopropyltrimethoxysilane ($H_2N(CH_2)_2NH(CH_2)_3Si(OCH_3)_3$) and N-(β-aminoethyl)-γ-aminopropylmethyldimethoxysilane ($H_2N(CH_2)_2NH(CH_2)_3SiCH_3(OCH_3)_2$), and the like. In addition to those compounds, there are, for example, organosilane compounds such as phenyltrimethoxysilane, phenyltriethoxysilane, p-chlorophenyltrimethoxysilane, p-bromomethylphenyltrimethoxysilane, diphenyldimethoxysilane, diphenyldiethoxysilane and diphenylsilanediol.

A filler having water-repelling property can be used as it is.

Examples of the above-mentioned filler are, for instance, one or more of metal fibers or metal powders such as glass fiber, graphite powder, bronze powder, gold powder, silver powder, copper powder, stainless steel powder, stainless steel fiber, nickel powder and nickel fiber; inorganic fibers or inorganic powders such as molybdenum disulfide powder, fluorinated mica powder, coke powder, carbon fiber, boron nitride powder and carbon black; organic powders such as heat-resistive aromatic resin powder, e.g. polyoxybenzoyl polyester, polyimide powder, tetrafluoroethylene-perfluoro (alkyl vinyl ether) copolymer (PFA) powder and polyphenylene sulfide powder; and the like. The filler is not limited thereto.

In case where two or more fillers are used, preferable combination is, for example, glass fiber and graphite powder, glass fiber and molybdenum disulfide powder, bronze powder and molybdenum disulfide powder, bronze powder and carbon fiber, graphite powder and coke powder, graphite powder and heat-resistive aromatic resin powder, carbon fiber and heat-resistive aromatic resin powder or the like. The mixing method may be either of wet method or dry method.

It is preferable that the above-mentioned filler has an average particle size of 10 to 1,000 μm.

It is preferable that the proportion of the filler is 2.5 to 100 parts (parts by weight, hereinafter the same), more preferably 5 to 80 parts on the basis of 100 parts of the PTFE powder.

The organic liquid forming liquid-liquid interface with water, which is used in the present invention may be an organic liquid capable of forming a liquid-liquid interface with water and being present as droplets in water or may be one which dissolves somewhat in water if it is capable of forming droplets in water and liquid-liquid interface with water. Examples thereof are, for instance, alcohols such as 1-butanol and 1-pentanol; ethers such as diethyl ether and dipropyl ether; ketones such as methyl ethyl ketone and 2-pentanone; aliphatic hydrocarbons such as pentane and dodecane; aromatic hydrocarbons such as benzene, toluene and xylene; halogenated hydrocarbons such as methylene chloride, tetrachloroethylene, trichloroethylene, chloroform, chlorobenzene, trichlorotrifluoroethane, monofluorotrichloromethane, difluorotetrachloroethane, 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane; and the like. Among them, the halogenated hydrocarbons are preferable, and particularly preferable are chlorinated- and fluorochlorinated-hydrocarbons such as 1,1,1-trichloroethane, 1,1-dichloro-2, 2,3,3,3-pentafluoropropane, 1,3-dichloro-1,1,2,2,3-pentafluoropropane, 1,1-dichloro-2,2,2-trifluoroethane and 1,1-dichloro-1-fluoroethane. Those are inflammable and satisfy requirements for fleon restrictions. Those organic liquids may be used solely or in a combination use of two or more thereof.

An amount of the above-mentioned liquid-liquid interface-forming organic liquid is 30 to 80% (% by weight, hereinafter the same), preferably 40 to 60% on the basis of the total amount of the PTFE powder and filler.

In the present invention, as mentioned above, it appears that the granulation of the PTFE powder and the filler is conducted in the droplets of the above-mentioned liquid-liquid interface-forming organic liquid and that, since the droplets of the liquid become smaller and more approximate to a spherical form because of functioning of a surfactant such as a nonionic surfactant or an anionic surfactant, particles having a smaller size and a form near sphere can be obtained, and an apparent density of the granular powder is increased.

Examples of the above-mentioned nonionic surfactant are, for instance, polyoxyethylamine oxides, alkylamine oxides, polyoxyethylene alkyl ethers, polyoxyethylene alkyl phenyl ethers, polyoxyethylene fatty acid esters, sorbitan fatty acid esters, polyoxyethylene sorbitan fatty acid esters, glycerine esters, polyoxyethylene alkylamine, the derivatives thereof, and the like.

More particularly, examples of the polyoxyethylamine oxides are dimethyloxyethylamine oxide and the like.

Examples of the alkylamine oxides are dimethyllaurylamine oxide, dimethyloleylamine oxide and the like.

Examples of the polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like.

Examples of the polyoxyethylene alkyl phenyl ethers are polyoxyethylene nonyl phenyl ether, polyoxyethylene octyl phenyl ether and the like.

Examples of the polyoxyethylene fatty acid esters are polyoxyethylene monolauric acid ester, polyoxyethylene monooleic acid ester, polyoxyethylene monostearic acid ester and the like.

Examples of the sorbitan fatty acid esters are sorbitan monolauric acid ester, sorbitan monopalmitic acid ester, sorbitan monostearic acid ester, sorbitan monooleic acid ester and the like.

Examples of the polyoxyethylene sorbitan fatty acid esters are polyoxyethylene sorbitan monolauric acid ester, polyoxyethylene sorbitan monopalmitic acid ester, polyoxyethylene sorbitan monostearic acid ester and the like.

Examples of the glycerine esters are monomyristic acid glyceryl, monostearic acid glyceryl, monooleic acid glyceryl and the like.

Examples of the derivatives of the above surfactants are, for example, polyoxyethylene alkyl phenyl-formaldehyde condensate, polyoxyethylene alkyl ether phosphate and the like.

Among them, preferable are the amine oxides and the polyoxyethylene alkyl phenyl ethers, and more preferable are polyoxyethylene nonyl phenyl ether, polyoxyethylene octyl phenyl ether and polyoxyethylamine oxide.

Examples of the above-mentioned anionic surfactant are, for example, higher fatty acid and its salt, alkyl sulfate, alkyl sulfonate, alkyl aryl sulfonate, alkyl phosphoric acid ester and the like. Particularly preferable anionic surfactants are a sulfate of higher alkyl alcohol, for example, sodium lauryl sulfate or a fluorine-containing sulfonic acid type- or carboxylic acid type-anionic surfactant having a fluoroalkyl group or chlorofluoroalkyl group. The typical compounds thereof are those represented by the formula (IV):

$$X(CF_2CF_2)_n(CH_2)_mA \qquad (IV)$$

or the formula (V):

$$X(CF_2CFCl)_n(CH_2)_mA \qquad (V)$$

wherein X is hydrogen, fluorine atom or chlorine atom, n is an integer of 3 to 10, m is 0 or an integer of 1 to 4, A is carboxyl group, sulfonic acid group or an alkali metal or ammonium salt thereof.

An amount of the above-mentioned surfactant is from 0.01 to 5%, preferably from 0.1 to 0.3% on the basis of the total amount of the PTFE powder and filler.

By using the surfactant in the above-mentioned range, there can be obtained an effect of a granular powder being in the spherical form and having a small article size, a narrow particle size distribution, an excellent powder flowability and a large apparent density.

In case of the surfactant, when a white filler such as glass, e.g. glass fibers, titanium oxide, titanate and/or boron nitride is used, there is a case where the sintered molding is colored, depending on the kind of a surfactant. When the white filler is used, the molding which is not colored white can be obtained by using the above-mentioned fluorine-containing anionic surfactant having a perfluoroalkyl group or a perchlorofluoroalkyl group as a hydrophobic moiety.

In the above-mentioned preparation process (3), the wet pulverization of the water-containing PTFE powder is carried out by means of a pulverizing machine which is of wet pulverization type and employs impact force for the pulverization. Though various pulverizing machines of that type are known, in the above-mentioned wet pulverization, it is desirable that at the same time of the pulverization, only fine powder pulverized to the desired particle size can be taken out continuously. For that reason, when the pulverizing machine is selected from the types which apply impact force with a hammer, it is desirable that a peripheral speed of the hammer is as high as possible.

One of the pulverizing machines satisfying such requirements is, for example, a "JIYU mill" available from Nara Kikai Seisakusho Kabushiki Kaisha. That pulverizing machine has a pulverizing chamber in the form of a cylinder compressed laterally, and plural rod-like protrusions having a rectangular or elliptic sectional form are provided on the facing two inside walls of the chamber. A disk-like rotor is disposed in parallel with the two inside walls in the center of the pulverizing chamber, and is equipped with the same rod-like protrusions on its both surfaces, which are arranged not to collide with the rod-like protrusions on the side walls when the rotor is rotated.

The above-mentioned water-containing PTFE powder is fed to the center of the pulverizing machine and blown off toward the peripheral direction of the rotor by a centrifugal force of the rotating rotor, thus colliding with the rod-like protrusions of the rotor and side walls to be pulverized by an impact force. There is provided a perforated panel in the form of a ring on the periphery in the rotating direction of the rotor. Only the particles pulverized to the size smaller than the perforated holes on the perforated panel pass through the holes and are taken outside the perforated panel. As the perforated panel, there may be used a metal net, a perforated thin metal sheet or various other ones. The diameter of the obtained particles varies depending on the diameter of the perforated holes. The smaller the hole diameter is, the smaller the particle size of the obtained particles is. However, since the particles are wet, the diameter of the particles taken out actually becomes fairly smaller than the diameter of the holes perforated on the perforated panel.

It appears that one of the reasons why the powder can be finely pulverized by the above-mentioned JIYU mill even under wet condition is that a high rotational speed of the rotor, that is, a peripheral speed of about 100 m/s can be obtained.

As a hammer type pulverizing machine capable of obtaining a peripheral speed of not less than that of the JIYU mill, there are a "Coloplex" and "Contraplex" available from Hosokawa Mikuron Kabushiki Kaisha, a "Fine Mill" available from Nippon Pneumatic Mfg. Co., Ltd. and the like. Those machines are all suitable for pulverizing under dry condition, and when used under the presence of water, there occur phenomena such that the peripheral speed is decreased and that since pneumatic classification method is used as a classifying mechanism, when the pulverized particles are wet, pneumatic classification does not function and the particles having a diameter larger than desired are classified and discharged. Also basically pulverizing machines of wet-pulverization type, for example, a shearing mill such as a colloid mill or a grinding machine cannot be used because the PTFE powder is subject to decomposition due to an extreme shearing force.

The filler-containing PTFE granular powder of the present invention is prepared by the preparation processes (1) to (3), for example, the methods mentioned below.

Preparation Process (1)

A ten-liter granulation tank is charged with 1 to 5 liters of ion-exchanged water, and 0.9 to 1.9 kgs of a PTFE powder and then 0.075 to 0.8 kg of a filler are added thereto.

Then 4 to 200 ml of 5% aqueous solution of a surfactant is added and the mixture is stirred with 100 φ dispersing blades for 2 to 5 minutes at a stirring speed of 2,000 to 3,000 rpm. Thus the mixture becomes in the state of slurry and the stirring is continued further for 5 to 10 minutes.

Further 450 to 1,500 ml of a liquid-liquid interface-forming organic liquid is added, and the granulation is carried out by stirring with the 100 φ dispersing blades for 1 to 2 minutes at a stirring speed of 1,000 to 2,000 rpm.

Then 0.5 to 5 liters of water is added, and the granulation was further carried out for shaping of the powder at a temperature of 10° to 30° C. at a stirring speed of 600 to 900 rpm for 0 to 30 minutes by using cone blade.

After that, the inside temperature of the granulation tank is raised up to a temperature in the range of 37.5° to 38.0° C. over 15 to 60 minutes and is kept at that temperature for 0 to 60 minutes.

This temperature keeping step and the above-mentioned mixing step with the dispersing blades immediately after the addition of the liquid-liquid interface-forming organic liquid are not conducted from the viewpoint of the separation of filler in case where the filler is, for example, glass fiber or a metal fiber or metal powder such as bronze powder, gold powder, silver powder, copper powder, stainless steel powder, stainless steel fiber, nickel powder or nickel fiber.

Then, the stirring is stopped, the granulates are separated from water by using a 150 mesh sieve and the granulates are dried in an electric oven at 165° C. for 16 hours to give the filler-containing PTFE granular powder of the present invention.

The preparation process (1) of the present invention can give a filler-containing PTFE granular powder which has physical properties mentioned hereinbelow and provides molded products with physical properties described hereinbelow. Particularly since the particle size distribution is narrow, additional steps, for example, a step of taking out particles of a small size with a sieve like a conventional method and a step of pre-mixing the PITFE powder and the filler, are not necessary. Thus, the filler-containing PTFE granular powder which cannot be prepared by a conventional process can be prepared.

(Physical properties of filler-containing PTFE granular powder)

Apparent density: not less than 0.60 g/cm$^3$

When less than 0.60 g/cm$^3$, an amount of powder to be filled in a die is small.

Flowability (21B method): not less than 6 times

When not more than 5.5 times, flowability in a hopper is not so good. Particularly 8 times is preferable.

Angle of repose: not more than 40 degrees

The powder having an angle of repose exceeding 42 degrees is not preferable because its flowability is not good. Particularly an angle of repose of not more than 40 degrees is preferable.

The angle of repose is not more than 38 degrees when the apparent density is not less than 0.9 g/cm$^3$ and less than 1.0 g/cm$^3$, and is not more than 36 degrees when the apparent density is more than 1.0 g/cm$^3$.

An angle of repose of a powder is affected by a gravity and becomes smaller as an apparent density becomes higher. Accordingly, the granular powder obtained by the granulation method of the present invention changes its angle of repose depending on its apparent density. The powders of the present invention have smaller angle of repose than that of granular powders obtained by conventional techniques.

The angle of repose of the powders obtained by the conventional techniques is not less than 40 degrees when the apparent density is not less than 0.6 g/cm$^3$ and less than 0.9 g/cm$^3$, not less than 38 degrees when the apparent density is not less than 0.9 g/cm$^3$ and less than 1.0 g/cm$^3$ and not less than 36 degrees when the apparent density is not less than 1.0 g/cm$^3$.

Particle size distribution A:

Granular powder remaining on a 10 mesh sieve: 0%

Granular powder remaining on a 20 mesh sieve: not more than 5%

The granular powder having the particle size distribution mentioned above after granulated is preferable since it is filled uniformly in the die because the particle size is uniform. It is particularly preferable that the granular powder remaining on the 10 mesh and 20 mesh sieves is 0%.

Particle size distribution B: not less than 50% by weight

The granular powder having the particle size distribution mentioned above after granulated is preferable because it is filled uniformly in the die. Particularly not less than 60% by weight is preferable.

Average particle size: not more than 500 μm

When larger than 500 μm, the powder cannot be filled in the thin-walled die. Particularly preferable is from 150 to 400 μm from the viewpoint of filling the powder in the thin-walled die.

(Physical properties of molded article)

Tensile strength: not less than 100 kgf/cm$^2$

When less than 100 kgf/cm$^2$, the molded article is inferior in mechanical strength. Preferable tensile strength is not less than 150 kgf/cm$^2$ and the tensile strength is determined depending on its application.

Elongation: 100 to 400%

When less than 100%, there is a case where the molded article is cut when mounted on an equipment or processed. Preferable elongation is not less than 150%.

Surface roughness: not larger than 3.0 μm

The molded article having a surface roughness larger than 3.0 μm is not preferable because that roughness is larger than desired. Particularly preferable surface roughness is not larger than 2.0 μm.

Preparation Process (2)

A ten-liter granulation tank is charged with 1 to 5 liters of ion-exchanged water, and 0.9 to 1.9 kgs of a PTFE powder is added thereto.

Then 4 to 200 ml of 5% aqueous solution of a surfactant is added and the mixture is stirred with 100 φ dispersing blades for 2 to 5 minutes at a stirring speed of 2,000 to 3,000 rpm. Thus the mixture becomes in the state of slurry.

Then 0.075 to 0.8 kg of a filler is added and the mixing is carried out with the 100 φ dispersing blades for 2 to 15 minutes at a stirring speed of 2,000 to 4,000 rpm.

The steps from a step of adding a liquid-liquid interface-forming organic liquid until the filler-containing PTFE granular powder of the present invention is obtained are the same as in the preparation process (1).

The preparation process (2) of the present invention can give a filler-containing PTFE granular powder which has physical properties mentioned hereinbelow and provides molded products with physical properties described hereinbelow. Particularly since the particle size distribution is narrow, additional steps, for example, a step of taking out particles of a small size with a sieve like a conventional method and a step of pre-mixing the PTFE powder and the filler, are not necessary. Thus, the filler-containing PTFE granular powder which cannot be prepared by a conventional process can be prepared.

(Physical properties of filler-containing PTFE granular powder)

Apparent density: not less than 0.60 g/cm$^3$

When less than 0.60 g/cm$^3$, an amount of powder to be filled in a die is small.

Flowability (21B method): not less than 6 times

When not more than 5.5 times, flowability in a hopper is not so good. Particularly 8 times is preferable.

Angle of repose: not more than 40 degrees

The powder having an angle of repose exceeding 42 degrees is not preferable because its flowability is not good. Particularly an angle of repose of not more than 40 degrees is preferable.

The angle of repose is not more than 38 degrees when the apparent density is not less than 0.9 g/cm$^3$ and less than 1.0 g/cm$^3$, and is not more than 36 degrees when the apparent density is not less than 1.0 g/cm$^3$.

Particle size distribution A:

Granular powder remaining on a 10 mesh sieve: 0%

Granular powder remaining on a 20 mesh sieve: not more than 5%

The granular powder having the particle size distribution mentioned above after granulated is preferable since it is filled uniformly in the die because the particle size is uniform. It is particularly preferable that the granular powder remaining on the 10 mesh and 20 mesh sieves is 0%.

Particle size distribution B: not less than 50% by weight

The granular powder having the particle size distribution mentioned above after granulated is preferable because it is filled uniformly in the die. Particularly not less than 60% by weight is preferable.

Average particle size: not more than 500 μm

When larger than 500 μm, the powder cannot be filled in the thin-walled die. Particularly preferable is from 150 to 400 μm from the viewpoint of filling the powder in the thin-walled die.

(Physical properties of molded article)

Tensile strength: not less than 100 kgf/cm$^2$

When less than 100 kgf/cm$^2$, the molded article is inferior in mechanical strength. Preferable tensile strength is not less than 150 kgf/cm$^2$ and the tensile strength is determined depending on its application.

Elongation: 100 to 400%

When less than 100%, there is a case where the molded article is cut when mounted on an equipment or processed. Preferable elongation is not less than 150%.

Surface roughness: not larger than 3.0 μm

The molded article having a surface roughness larger than 3.0 μm is not preferable because that roughness is larger than desired. Particularly preferable surface roughness is not larger than 2.0 μm.

Preparation Process (3)

A PTFE powder having an average particle size of 2 to 3 mm and taken out of the polymerization system in usual suspension polymerization method is pre-pulverized by means of a pipe line homomixer to give a water-containing PTFE powder having an average particle size of 200 to 1,000 μm and a water content of 5 to 30% by weight.

The obtained water-containing PTFE powder is poured in the JIYU mill mentioned above and wet-pulverized under the conditions of motor power of 2.2 kW and a capacity of 1.0 to 100 kg/hr by using a screen having plural holes of 0.1 to 0.3 mm diameter as a perforated panel, and thus, a powder having an average particle size of 20 to 100 μm and a water content of 5 to 30% is obtained. The steps from a step of adding the obtained powder of 1.575 to 2.6 kgs to the ion-exchanged water until the filler-containing PTFE granular powder of the present invention is obtained are the same as in Preparation Process (2).

The preparation process (3) of the present invention can give a filler-containing PTFE granular powder which has physical properties mentioned hereinbelow and provides molded products with physical properties described hereinbelow. Particularly since the particle size distribution is narrow, additional steps, for example, a step of taking out particles of a small size with a sieve like a conventional method and a step of pre-mixing the PTFE powder and the filler, are not necessary. Thus, the filler-containing PTFE granular powder which cannot be prepared by a conventional process can be prepared.

Physical properties of filler-containing PTFE granular powder)

Apparent density: not less than 0.60 g/cm$^3$

When less than 0.60 g/cm$^3$, an amount of powder to be filled in a die is small.

Flowability (21B method): not less than 6 times

When not more than 5.5 times, flowability in a hopper is not so good. Particularly 8 times is preferable.

Angle of repose: not more than 40 degrees

The powder having an angle of repose exceeding 42 degrees is not preferable because its flowability is not good. Particularly an angle of repose of not more than 40 degrees is preferable.

The angle of repose is not more than 38 degrees when the apparent density is not less than 0.9 g/cm$^3$ and less than 1.0 g/cm$^3$, and is not more than 36 degrees when the apparent density is not less than 1.0 g/cm$^3$.

Particle size distribution A:

Granular powder remaining on a 10 mesh sieve: 0%

Granular powder remaining on a 20 mesh sieve: not more than 5%

The granular powder having the particle size distribution mentioned above after granulated is preferable since it is filled uniformly in the die because the particle size is uniform. It is particularly preferable that the granular powder remaining on the 10 mesh and 20 mesh sieves is 0%.

Particle size distribution B: not less than 50% by weight

The granular powder having the particle size distribution mentioned above after granulated is preferable because it is filled uniformly in the die. Particularly not less than 60% by weight is preferable.

Average particle size: not more than 500 μm

When larger than 500 μm, the powder cannot be filled in the thin-walled die. Particularly preferable is from 150 to 400 μm from the viewpoint of filling the powder in the thin-walled die.

(Physical properties of molded article)

Tensile strength: not less than 100 kgf/cm$^2$

When less than 100 kgf/cm$^2$, the molded article is inferior in mechanical strength. Preferable tensile strength is not less than 150 kgf/cm$^2$ and the tensile strength is determined depending on its application.

Elongation: 100 to 400%

When less than 100%, there is a case where the molded article is cut when mounted on an equipment or processed. Preferable elongation is not less than 150%.

Surface roughness: not larger than 3.0 μm

The molded article having a surface roughness larger than 3.0 μm is not preferable because that roughness is larger than desired. Particularly preferable surface roughness is not larger than 2.0 μm.

The preferred conditions for preparing the filler-containing PTFE granular powder of the present invention are, for example, as follows:

| | | |
|---|---|---|
| (1) (A) PTFE powder | 100 parts | |
| (B) Filler | 2.5 to 100 parts | |
| (C) Surfactant (on the basis of the sum of (A) and (B)) | 0.01 to 5% | |
| (D) Liquid-liquid interface-forming organic liquid (on the basis of the sum of (A) and (B)) | 30 to 80% | |
| Order of addition: | | |
| (A) → (B) → (C) → (in the state of slurry) → (D) | | |

More preferable are the conditions mentioned below.

| | |
|---|---|
| (A) PTFE powder | 100 parts |
| (B1) Glass fiber or carbon fiber | 5 to 30 parts |
| (C1) Nonionic surfactant (on the basis of the sum of (A) and (B1)) | 0.1 to 1% |
| (D1) Halogenated hydrocarbon (on the basis of the sum of (A) and (B1)) | 40 to 60% |
| Order of addition: | |
| (A) → (B1) → (C1) → (in the state of slurry) → (D1) | |
| (2) (A) PTFE powder | 100 parts |
| (B) Filler | 2.5 to 100 parts |
| (C) Surfactant (on the basis of the sum of (A) and (B)) | 0.01 to 1% |
| (D) Liquid-liquid interface-forming organic liquid (on the basis of the sum of (A) and (B)) | 30 to 80% |
| Order of addition: | |
| (A) → (C) → (in the state of slurry) → B) → (D) | |

More preferable are the conditions mentioned below.

| | |
|---|---|
| (A) PTFE powder | 100 parts |
| (B1) Glass fiber or carbon fiber | 5 to 30 parts |
| (C1) Nonionic surfactant (on the basis of the sum of (A) and (B1)) | 0.1 to 0.3% |
| (D1) Halogenated hydrocarbon (on the basis of the sum of (A) and (B1)) | 40 to 60% |
| Order of addition: | |
| (A) → (Ci) → (in the state of slurry) → (B1) → (D1) | |
| (3) (A1) Water-containing PTFE powder (water content: 5 to 30%) | 100 parts |
| (B) Filler | 2.5 to 100 parts |
| (C) Surfactant (on the basis of the sum of (A1) and (B)) | 0.01 to 1% |
| (D) Liquid-liquid interface-forming organic liquid (on the basis of the sum of (A1) and (B)) | 30 to 80% |
| Order of addition: | |
| (A1) → (C) → (in the state of slurry) → (B) → (D) | |

More preferable are the conditions mentioned below.

| | |
|---|---|
| (A1) Water-containing PTFE powder (water content: 5 to 30%) | 100 parts |
| (B1) Glass fiber or carbon fiber | 3 to 34 parts |
| (C1) Nonionic surfactant (on the basis of the sum of (A1) and (B1)) | 0.1 to 0.3% |
| (D1) Halogenated hydrocarbon (on the basis of the sum of (A1) and (B1)) | 40 to 60% |
| Order of addition: | |
| (A1) → (C1) → (in the state of) → (BI) → (D1) | |

The present invention is then explained by means of Examples, but is not limited thereto.

EXAMPLE 1

A ten-liter granulation tank was charged with 1.5 liters of ion-exchanged water, followed by the addition, by turns, of 1.275 kg (dry basis) of a PTFE powder (POLYFLON M-12 available from Daikin Industries, Ltd., PTFE homopolymer) having an average particle size of 31 μm after the pulverization and 0.225 kg of glass fibers (EPG40M-10A available from Nippon Denki Glass Kabushiki Kaisha, average diameter: 12 μm, average fiber length: 80 μm) which had been subjected to water-repellent-treatment previously with an aminosilane coupling agent.

Then, 90 ml of 5% by weight aqueous solution of the amine oxide type nonionic surfactant (dimethyloxyethylamine oxide) was added.

Subsequently the stirring was carried out with 100 φ dispersing blades at a stirring speed of 3,000 rpm for two minutes, and the PTFE powder and the filler got wet and became in the state of viscous slurry having a viscosity of 10 to 1,000 cps, followed by mixing with stirring for three minutes in that state.

Then, 750 ml of a liquid-liquid interface-forming organic liquid (methylene chloride) was added. And, granulation was carried out at a stirring speed of 1,500 to 2,000 rpm for 1 to 2 minutes by using 100 φ dispersing blade.

Then 4.5 liters of water was added, and the granulation was further carried out, for shaping of the granular powder, at 25° C.±2° C. for 15 minutes under stirring at 800 rpm by using cone blade.

Subsequently, the stirring was stopped when the temperature in the tank was raised up to 38° C. over 20 minutes. The granulates were separated from water by using a 150 mesh sieve and dried in an electric oven at 165° C. for 16 hours to obtain a filler-containing PTFE granular powder of the present invention, and the following tests were carried out.

Apparent density: Measured in accordance with JIS K 6891-5.3

Average particle size after pulverization (Primary particle size):

Wet sieve method: JIS standard sieves of 20 mesh (sieve opening: 840 μm), 250 mesh (sieve opening: 62 μm), 270 mesh (sieve opening: 53 μm), 325 mesh (sieve opening: 44 μm) and 400 mesh (sieve opening: 37 μm) are used. First, the 20 mesh sieve is placed on the 250 mesh sieve, and 5 g of a sample powder is put on the 20 mesh sieve. By spraying carbon tetrachloride carefully with a sprayer at a rate of about 3 liters/m² for about 30 seconds, the powder is rinsed on the lower sieve. When the sample powder has been rinsed completely, the upper sieve is removed and spraying all over the lower sieve is conducted for about four minutes. After that, the lower sieve is air-dried and a weight of the dried powder remaining thereon is measured. A series of the above-mentioned steps are repeated by using the 20 mesh sieve and each of the other three sieves of smaller meshes, respectively, and 5 g each of new sample powder is used. In order to obtain an accumulated weight percentage, the weights of the powder remaining on each sieve are multiplied by 20 and then those obtained values are plotted on a logarithmic probability paper to openings of each sieve. Those plotted points are connected with a line, particle sizes corresponding to the accumulated weight percentages 50($d_{50}$) and 84($d_{34}$) are read, and wet sieve size ($d_{ws}$) is calculated by the following equation.

$$\log_e d_{ws} = \log_e d_{50} - \frac{1}{2}\left(\log_e \frac{d_{34}}{d_{50}}\right)^2$$

Flowability (called 21B method): Measured in accordance with the method described in JP-A-259925/1991.

Figure 1:
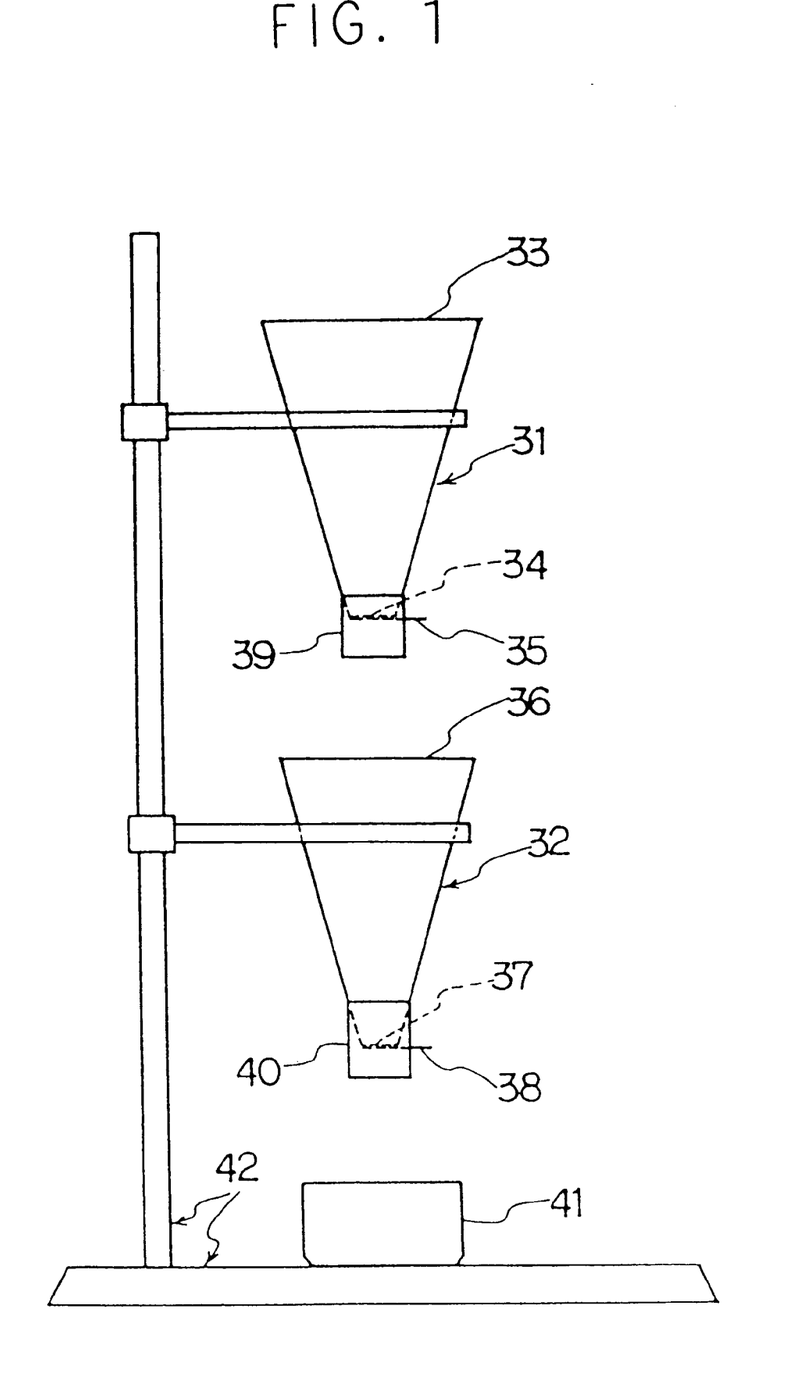
FIG. 1 is a diagrammatic view of an apparatus used for determining flowability of the granular powder in the present invention.

Namely, there is used a measuring device comprising a support base 42 and an upper hopper 31 and a lower hopper 32, the both of which are aligned on their center lines and supported on the support base 42 as shown in FIG. 1 (corresponding to FIG. 3 described in JP-A259925/1991). The upper hopper 31 has an inlet 33 of 74 mm diameter, an outlet 34 of 12 mm diameter and a partition plate 35. The height from the inlet 33 to the outlet 34 is 123 mm. The partition plate 35 is provided on the outlet 34, and thereby the powder in the hopper can be kept therein and dropped optionally. The lower hopper 32 has an inlet 36 of 76 mm diameter, an outlet 37 of 12 mm diameter and a partition plate 38. The height from the inlet 36 to the outlet 37 is 120 mm, and the partition plate 38 is provided on the outlet 37 like the upper hopper. The upper hopper and the lower hopper are adjusted so that the distance between the both partition plates is 15 cm. In FIG. 1, the numerals 39 and 40 indicate outlet covers of each hopper, and the numeral 41 indicates a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 μm). The measurement of the flowability is carried out at the same temperature.

(I) At first, immediately after the upper hopper 31 is charged with just a cup of powder by using a 30 cc cup, the partition plate 35 is pulled out to drop the powder into the lower hopper. When the powder does not drop, the powder is stuck with a wire. After the powder has dropped completely into the lower hopper 32, the dropped powder is allowed to stand for 15±2 seconds, and then the partition plate 38 of the lower hopper is pulled out to see whether the powder is dropped or not from the outlet 37. When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good." In case where the powder is never dropped, the flowability of the powder is estimated to be "Not good." In case where in three series of the dropping test, the powder has been dropped only one time, the dropping test is further conducted twice, and when the two series of the dropping test are both satisfactory, the flowability is estimated to be "Good." In other cases, the flowability is estimated to be "Not good."

(III) With respect to the powder estimated to be "Good," the upper hopper is charged with two cups of powder by using the same 30 cc cup, and the dropping test of the powder is conducted in the same manner as above. When as a result, the flowability is estimated to be "Good," the number of cups filled with the powder is increased successively and the dropping test is continued until the flowability is estimated to be "Not good." The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is subtracted by 1, and the obtained value is taken as "Flowability" of the powder.

Average particle size and particle size distribution A of granular powder:

Standard sieves of 10, 20, 32, 48 and 60 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size.

Particle size distribution B:

The particle size distribution B is a proportion in weight of the particles having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained.

Tensile strength (hereinafter may be referred to as "TS") and elongation (hereinafter may be referred to as "EL"):

A die having an inner diameter of 100 mm is charged with 25 g of powder, and a pressure is applied gradually over about 30 seconds until the final pressure becomes about 500 kg/cm². Then that pressure is kept for two minutes to give a pre-molded article. The pre-molded article is taken out of the die mold and put in an electric oven being kept at 365° C. to be subjected to sintering for three hours. Then the sintered article is punched with a JIS dumbbell No. 3 to give a sample. A stress at break and elongation of the sample are measured in accordance with JIS K 6891-58 by stretching at a stretching rate of 200 mm/min with an autograph having a gross weight of 500 kg.

Angle of repose:

Measured with Powder Tester available from Hosokawa Micron Co., Ltd.

Z value (coloring):

A 50 mm diameter die was filled with 200 g of a granular powder which was then maintained at a molding pressure of 500 kg/cm$^2$ for five minutes. The obtained pre-molded article (diameter: about 50 mm, height: about 50 mm) was heated up from room temperature to 365° C. at a temperature raising rate of 50° C./hr. After having been maintained at 365° C. for 5.5 hours, the pre-molded article was cooled at a cooling rate of 50° C./hr and then the molded article was cut crosswise with a lathe at the point about 25 mm from its end (at the center of its height). Then the Z value on the center of the cut portion was measured through Z value measuring method of the XYZ calorimetric system of Commission International de Leclairage.

Surface roughness:

A 50 mm diameter die mold was charged with 210 g of powders and maintained for five minutes at a molding pressure of 500 kg/cm$^2$. The obtained pre-molded article was heated up from room temperature to 365° C. at a heating rate of 50° C./hr. After maintained at 365° C. for 5.5 hours, the pre-molded article was cooled at a cooling rate of 50° C./hr. The top surface of the obtained molded article was measured according to the center line average roughness ($R_a$) method described in JIS B 0601 by using a surface roughness measuring device available from Tokyo Seimitsu Kikai Kabushiki Kaisha.

With respect to the filler-containing PTFE granular powder obtained in Example 1, the photographs of the particles in the powder were taken in the following way.

Shape of particle: By using a Video Microscope of optical microscope available from SONY Corporation, photographs were taken at 100 magnifications and 200 magnifications.

Figure 2:
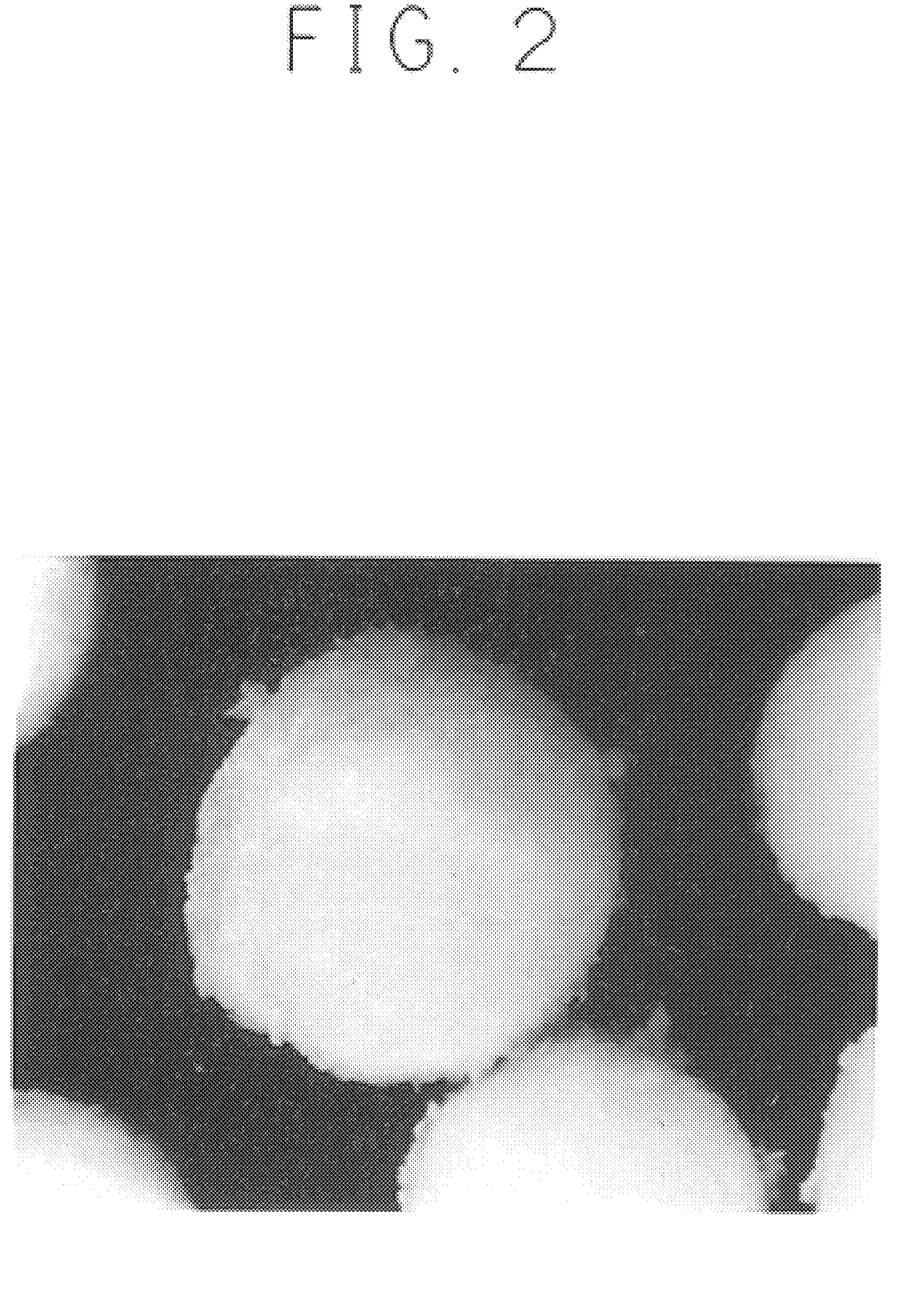
FIG. 2 is an optical microscopic photograph (magnification: ×100) showing a structure of particles in the filler-containing PTFE granular powder of the present invention, which was obtained in Example 1.

The results are shown in Table 1 and FIG. 2.

EXAMPLE 2

A ten-liter granulation tank was charged with 1.5 liters of ion-exchanged water, and 1.350 kg (dry basis) of a pulverized PTFE powder (POLYFLON M-12 available from Daikin Industries, Ltd., PTFE homopolymer) having an average particle size of 31 $\mu$m and 0.150 kg of carbon fibers (pitch-type carbon fiber SG-249 available from Osaka Gas Chemical Kabushiki Kaisha) were added by turns.

Then the mixing was carried out with 100 $\phi$ dispersing blades at a stirring speed of 4,000 rpm for five minutes.

Then, 90 ml of 5% by weight aqueous solution of the $\mu$mine oxide type nonionic surfactant (dimethyloxyethylamine oxide) was added.

Subsequently the stirring was carried out with 100 $\phi$ dispersing blades at a stirring speed of 3,000 rpm for two minutes, and the mixture became in the state of slurry, followed by mixing with stirring for three minutes in that state.

Then 750 ml of a liquid-liquid interface-forming organic liquid (methylene chloride) was added. And, granulation was carried out with 100 $\phi$ dispersing blades at a stirring speed of 2,000 rpm for 2 minutes.

Then 4.5 liters of water was added, and the granulation was further carried out, for shaping of the granular powder, at 25° C.±2° C. for 15 minutes under stirring at 800 rpm by using cone blade.

Subsequently, the temperature in the tank was raised up to 38° C. over 20 minutes, that temperature was maintained for 10 minutes and then the stirring was stopped. The granulates were separated from water by using a 150 mesh sieve and dried in an electric oven at 165° C. for 16 hours to obtain a filler-containing PTFE granular powder of the present invention. The same tests as in Example 1 were carried out and a photograph was taken.

Figure 3:
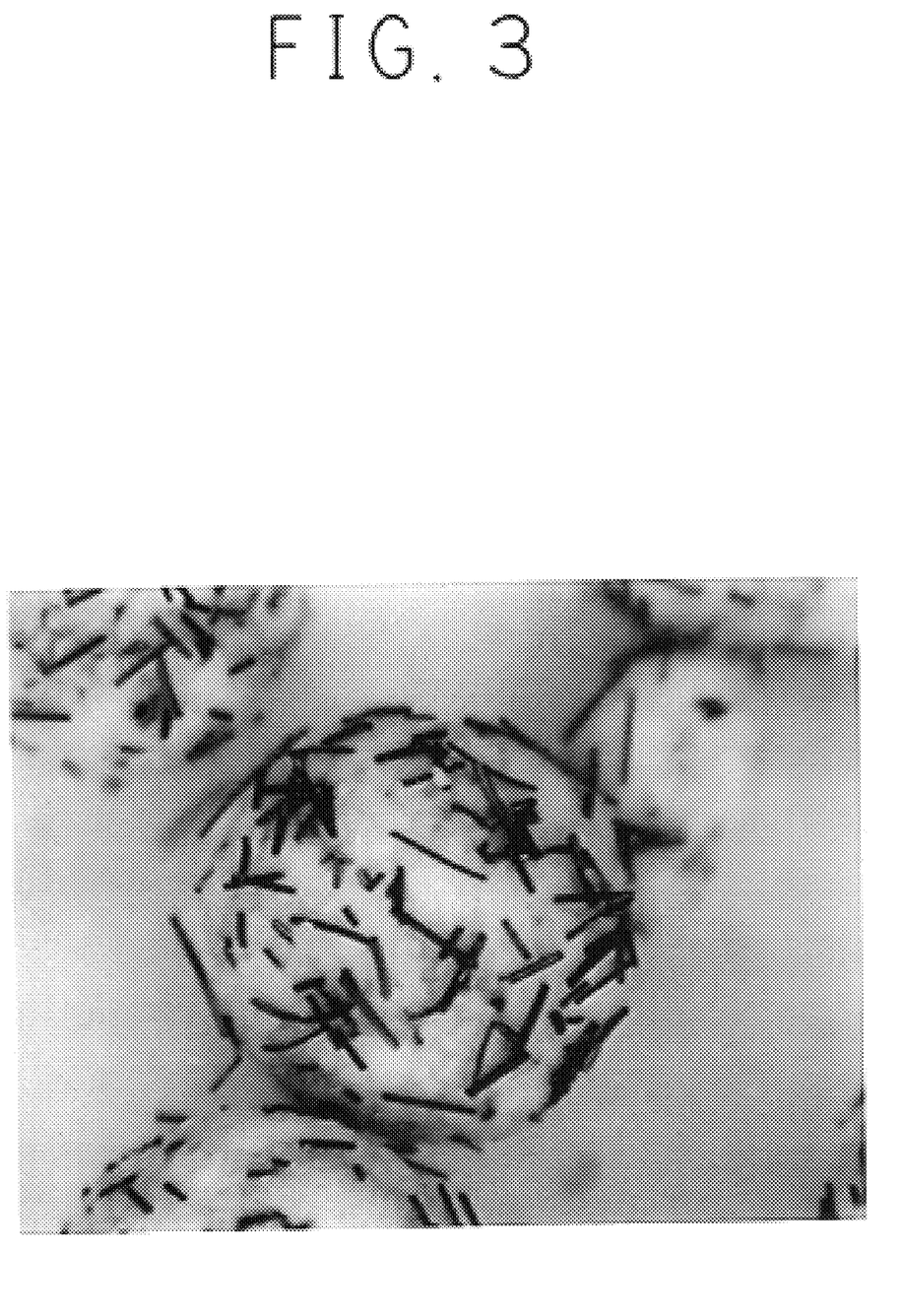
FIG. 3 is an optical microscopic photograph (magnification: ×200) showing a structure of particles in the filler-containing PTFE granular powder of the present invention, which was obtained in Example 2.

The results are shown in Table 1 and FIG. 3.

Comparative Example 1

A 150-liter Henschel mixer available from Mitsui Miike Kabushiki Kaisha was charged with 22.5 kg of a PTFE powder (POLYFLON M-111 available from Daikin Industries, Ltd., modified PTFE in which 0.1% by mole of perfluoro(propyl vinyl ether) is copolymerized) and 2.5 kg of glass fibers (average diameter: 15.8 $\mu$m, average fiber length 80 $\mu$m) which had not been subjected to water-repellent-treatment and are available from Owens Corning, followed by dry-mixing at a stirring speed of 1,130 rpm for 12 minutes to give 25 kg of a uniform mixture.

Then, 40 kg of the obtained mixture was poured in a 300-liter ribbon mixer available from Kinki Kogyo Kabushiki Kaisha. With rotating at a speed of 20 rpm, 44 liters of a liquid-liquid interface-forming organic liquid (perchloroethylene) was added over three minutes, and then the granulation was carried out with rotating for 10 minutes.

Then the obtained granulates were supplied to a flush mill (a cutter was rotating at 1,000 rpm) available from Fuji Powdal at a feeding rate of 6 kg/min. The granulates, after pulverized, were again poured in the above-mentioned ribbon mixer to be granulated with rotating at a speed of 20 rpm for ten minutes to give a filler-containing PTFE granular powder. The same tests as in Example 1 were carried out and a photograph was taken.

Figure 4:
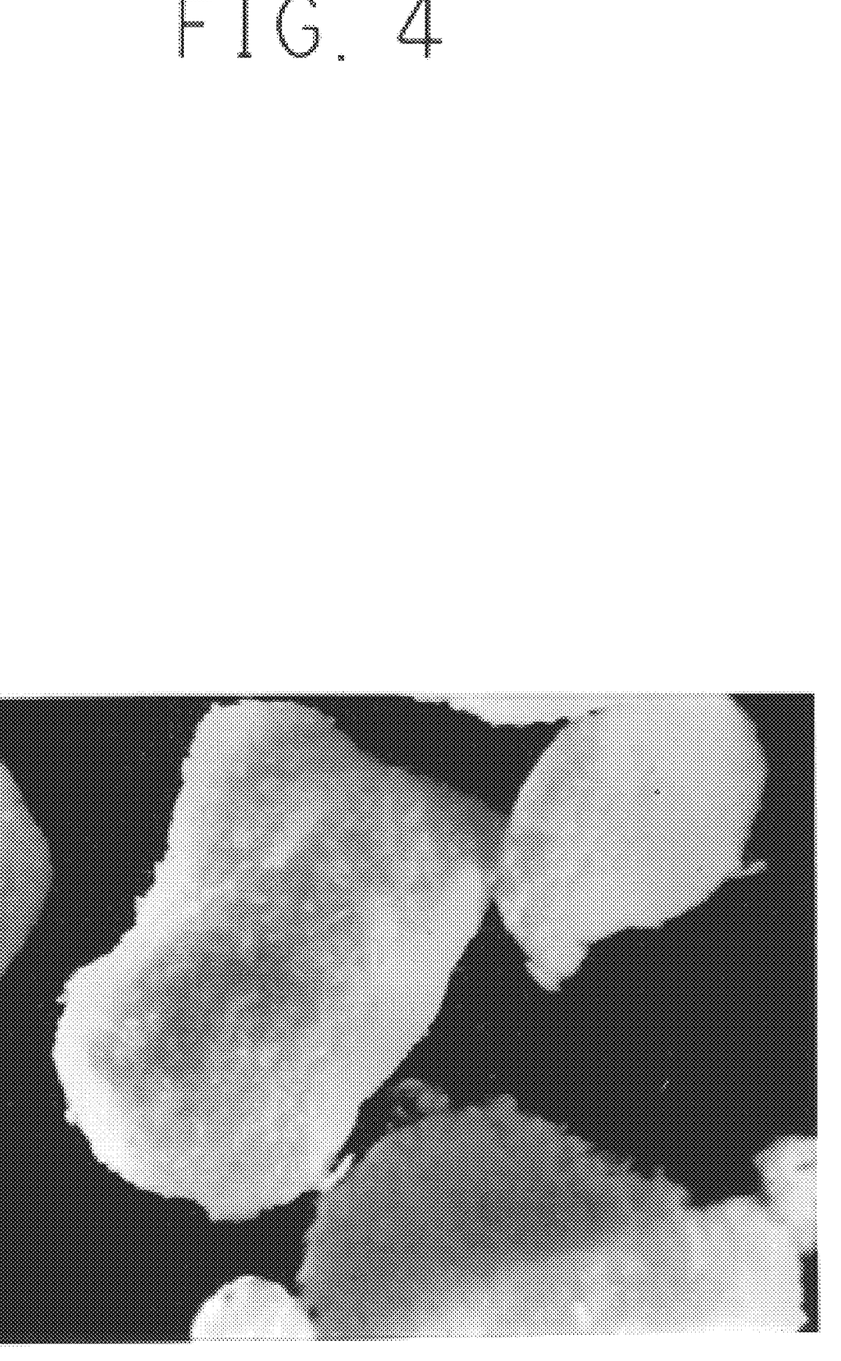
FIG. 4 is an optical microscopic photograph (magnification: ×100) showing a structure of particles in the filler-containing PTFE granular powder which was obtained in Comparative Example 1.

The results are shown in Table 1 and FIG. 4.

Comparative Example 2

First, 9.35 kg (dry basis) of a pulverized PTFE powder (POLYFLON M-12 available from Daikin Industries, Ltd., PTFE homopolymer) having an average particle size of 28 $\mu$m and 1.65 kg of glass fibers (average diameter: 12 $\mu$m, average fiber length: 80 $\mu$m) which were subjected to water-repellent-treatment with an aminosilane coupling agent previously were pre-mixed by using a 75-liter Henschel mixer.

A 10-liter granulation tank was charged with 6 liters of ion-exchanged water and further 2 kg of the mixture of the PTFE powder and the carbon fibers obtained by the above-mentioned pre-mixing.

Then, 1,200 ml of a liquid-liquid interface-forming organic liquid (methylene chloride) was added. And, granulation was carried out at 25° C.±2° C. for 5 minutes under stirring at 800 rpm by using cone blade.

The stirring was continued for 2 minutes at 2,000 rpm by using dispersing blade of 100 $\phi$.

Then granulation was further carried out, for shaping of the granular powder, at 25°±2° C. for ten minutes under stirring at 800 rpm by using cone blade.

Figure 5:
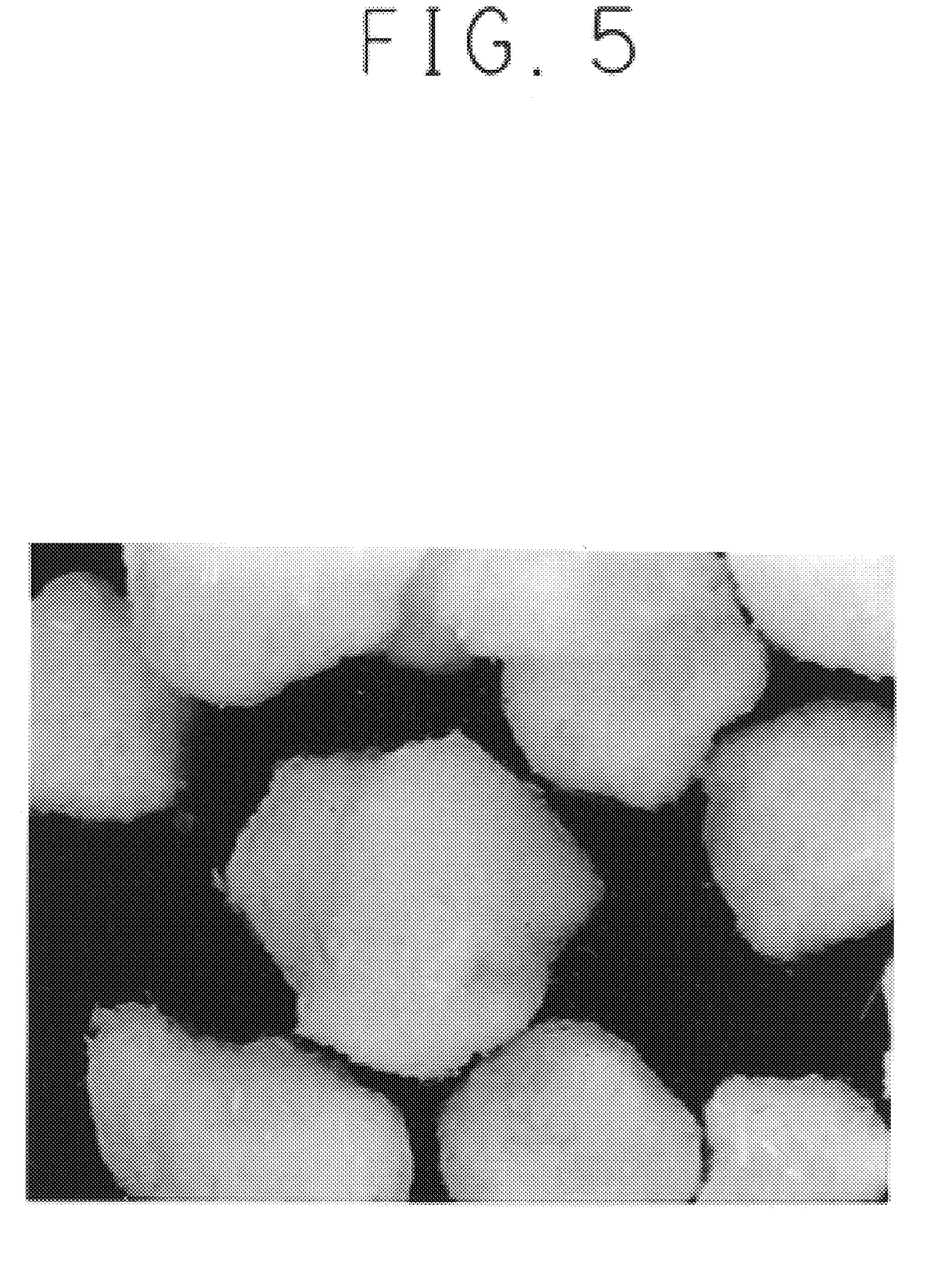
FIG. 5 is an optical microscopic photograph (magnification: ×100) showing a structure of particles in the filler-containing PTFE granular powder which was obtained in Comparative Example 2.

Subsequently, the temperature in the tank was raised up to 38° C. over 20 minutes, and the stirring was stopped. The granulates obtained by using a 150 mesh sieve was dried in an electric oven at 165° C. for 16 hours to obtain a filler-containing PTFE granular powder. The same tests as in Example 1 were carried out, and a photograph was taken The results thereof are shown in Table 1 and FIG. 5.

Comparative Example 3

Figure 6:
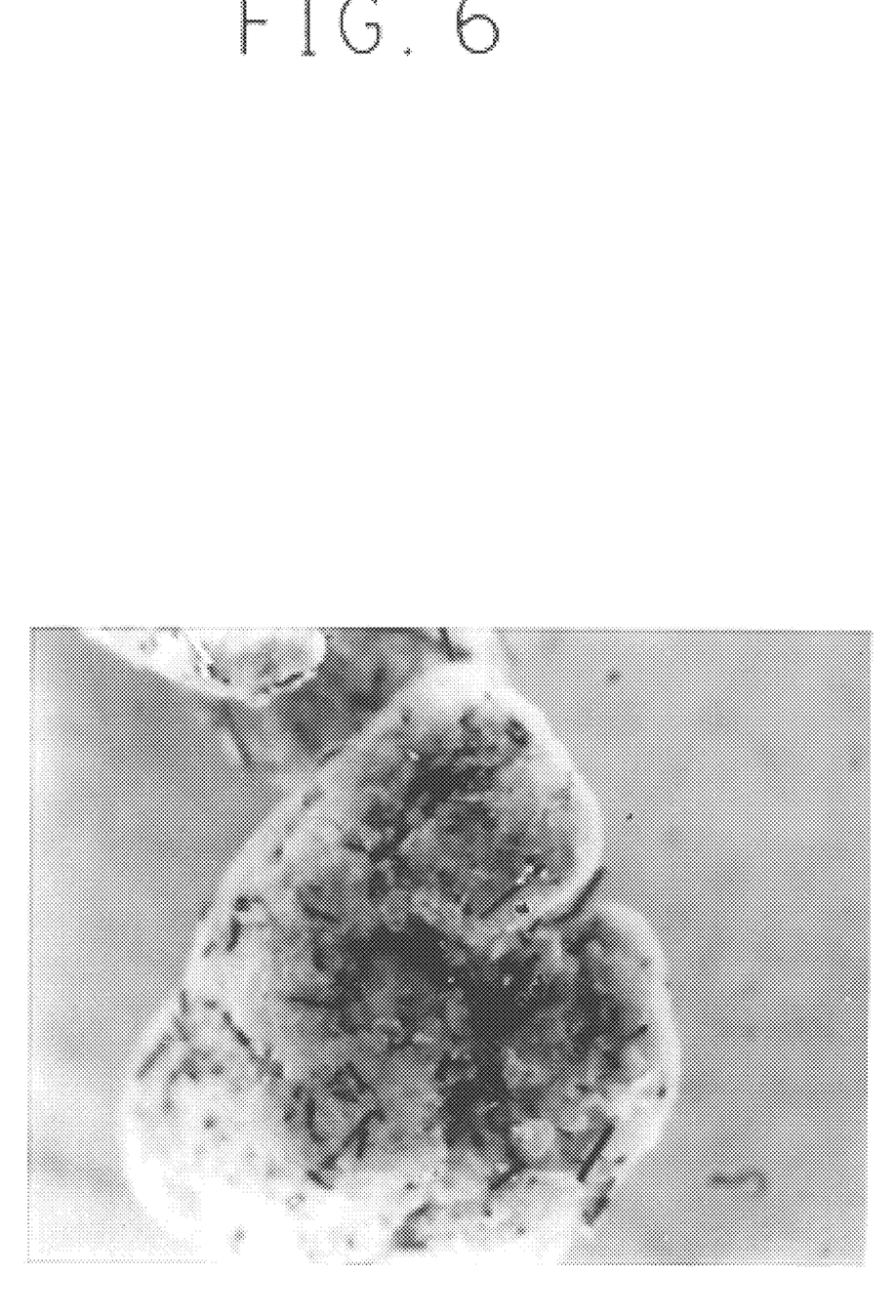
FIG. 6 is an optical microscopic photograph (magnification: ×200) showing a structure of particles in the filler-containing PTFE granular powder which was obtained in Comparative Example 3.

The same procedures as in Comparative Example 1 were repeated except that 21.25 kg of the PTFE powder was used and that there was employed, instead of glass fibers, 3.75 kg of the carbon fibers used in Example 2, to give a filler-containing PTFE granular powder. The same tests as in Example 1 were carried out, and a photograph was taken. The results thereof are shown in Table 1 and FIG. 6.

Comparative Example 4

First, 9.35 kg (dry basis) of a pulverized PTFE powder (POLYFLON M-12 available from Daikin Industries, Ltd., PTFE homopolymer) having an average particle size of 28 µm and 1.65 kg of carbon fibers used in Example 2 were pre-mixed by using a 75-liter Henschel mixer.

A 10-liter granulation tank was charged with 6 liters of ion-exchanged water and further 2 kg of the mixture of the PTFE powder and the carbon fibers obtained by the above-mentioned pre-mixing.

Then, 1,200 ml of a liquid-liquid interface-forming organic liquid (methylene chloride) was added. And, granulation was carried out at 25° C.±2° C. for 5 minutes under stirring at 800 rpm by using cone blade.

The stirring was continued for 2 minutes at 2,000 rpm by using dispersing blade of 100 φ.

Then granulation was further carried out, for shaping of the granular powder, at 25°±2° C. for ten minutes under stirring at 800 rpm by using cone blade.

Figure 7:
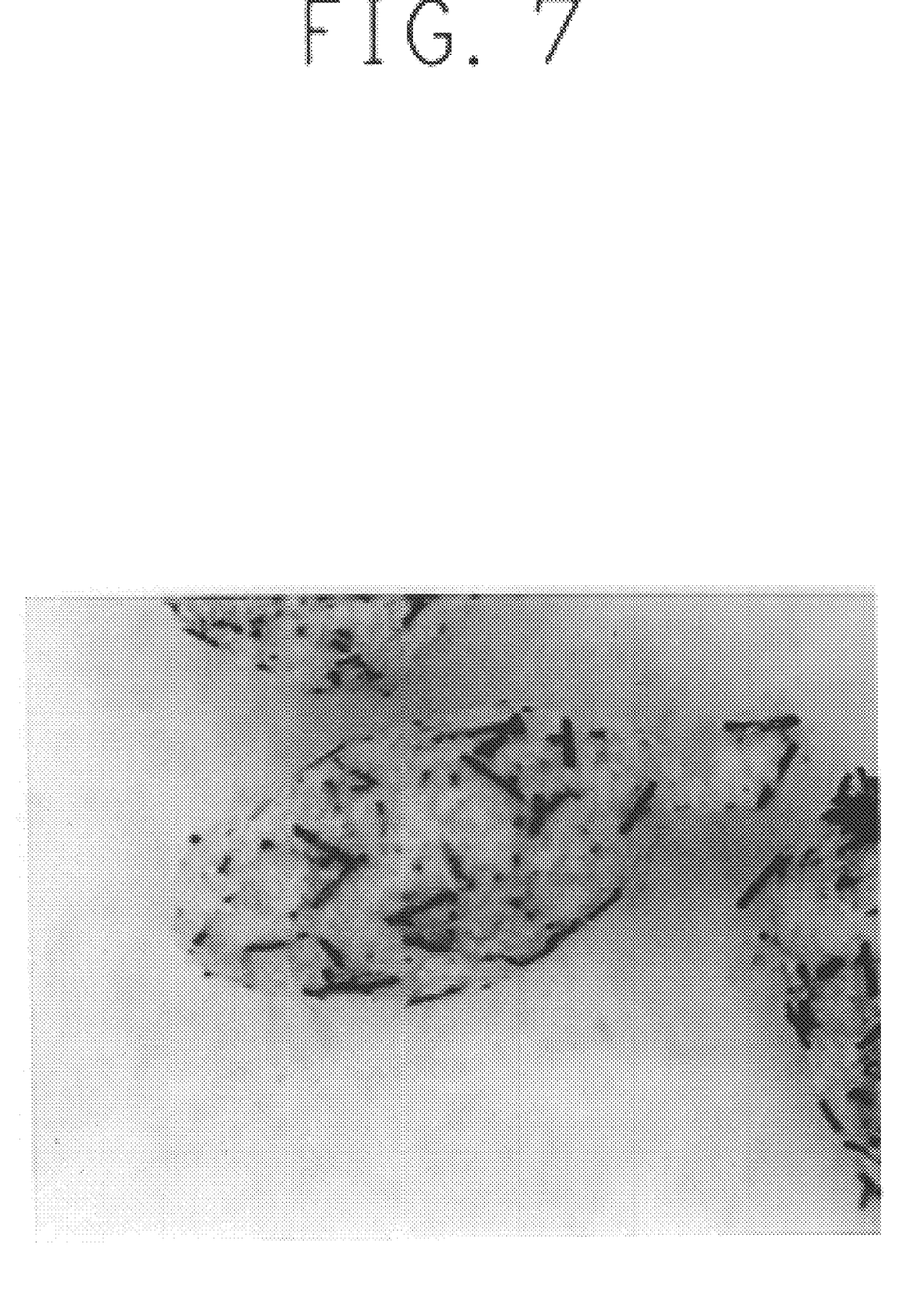
FIG. 7 is an optical microscopic photograph (magnification: ×200) showing a structure of particles in the filler-containing PTFE granular powder which was obtained in Comparative Example 4.

Subsequently, the temperature in the tank was raised up to 38° C. over 20 minutes, and the stirring was stopped. The granulates obtained by using a 150 mesh sieve was dried in an electric oven at 165° C. for 16 hours to obtain a filler-containing PTFE granular powder. The same tests as in Example 1 were carried out, and a photograph was taken. The results thereof are shown in Table 1 and FIG. 7.

TABLE 1

|  | Ex. 1 | Ex. 2 | Com. Ex. 1 | Com. Ex. 2 | Com. Ex. 3 | Com. Ex. 4 |
| --- | --- | --- | --- | --- | --- | --- |
| PTFE powder | M-12 | M-12 | M-111 | M-12 | M-111 | M-12 |
| Average particle size after pulverization (µm) | 31 | 31 | 28 | 28 | 28 | 28 |
| Filler | Glass fiber | Carbon fiber | Glass fiber | Glass fiber | Carbon fiber | Carbon fiber |
| Apparent density (g/ml) | 0.8 | 0.75 | 0.73 | 0.76 | 0.72 | 0.72 |
| Flowability (times) | 8.0 | 8.0 | 5 to 6 | 8.0 | 3.0 | 5.0 |
| TS (kg/cm$^2$G) | 213 | 153 | 218 | 193 | 271 | 148 |
| EL (%) | 292 | 256 | 291 | 280 | 277 | 236 |
| Particle size distribution A (% by weight) |  |  |  |  |  |  |
| 10 on | 0.0 | 0.0 | 1.0 | 0.2 | 1.0 | 0.0 |
| 20 on | 0.4 | 0.2 | 28.2 | 4.0 | 32.4 | 1.0 |
| 32 on | 11.4 | 11.4 | 35.4 | 49.7 | 37.4 | 53.8 |
| 48 on | 62.0 | 65.0 | 28.2 | 43.6 | 22.4 | 41.0 |
| 60 on | 17.6 | 14.6 | 7.2 | 1.8 | 2.8 | 2.6 |
| 60 pass | 8.6 | 9.0 | 0.0 | 0.8 | 4.0 | 0.7 |
| Particle size distribution B (% by weight) | 71.1 | 71.8 | 41.8 | 55.1 | 41.5 | 56.2 |
| Average particle size after granulation (µm) | 350 | 360 | 690 | 510 | 670 | 500 |
| Angle of repose (degree) | 38 | 35 | 46 | 42 | 45 | 43 |
| Z value | 68 | — | 72 | 70 | — | — |
| Surface roughness (µm) | 1.9 | 1.6 | 3.1 | 2.8 | 2.8 | 2.5 |

EXAMPLES 3 to 7

The same procedures as in Example 1 were repeated except that the surfactant was changed to an ammonium salt of perfluorooctanoic acid and the amounts thereof were those shown in Table 2, to give a filler-containing PTFE granular powder of the present invention. The same tests as in Example 1 were carried out except that in the test of the particle size distribution A, the 80 mesh sieve was placed under the 60 mesh sieve, and the results thereof are shown in Table 2.

Comparative Example 5

The same procedures as in Example 3 were repeated except that there were employed oleyl sodium sulfate as a surfactant and its content was 0.1% by weight, to give a filler-containing PTFE granular powder. The same tests as in Example 3 were carried out. The results are shown in Table 2.

TABLE 2

|  | Ex. 3 | Ex. 4 | Ex. 5 | Ex. 6 | Ex. 7 | Com. Ex. 5 |
| --- | --- | --- | --- | --- | --- | --- |
| Anionic surfactant (% by weight) | 0.01 | 0.05 | 0.1 | 0.2 | 0.3 | 0.1 |
| Apparent density (g/cm$^3$) | 0.83 | 0.83 | 0.84 | 0.81 | 0.76 | 0.80 |
| Flowability (21 B method) (times) | 6.0 | 8.0 | 8.0 | 8.0 | 8.0 | 8.0 |

TABLE 2-continued

|  | Ex. 3 | Ex. 4 | Ex. 5 | Ex. 6 | Ex. 7 | Com. Ex. 5 |
|---|---|---|---|---|---|---|
| TS (kg/cm²G) | 220 | 218 | 219 | 215 | 214 | 210 |
| EL (%) | 312 | 309 | 310 | 307 | 305 | 299 |
| Particle size distribution A (% by weight) | | | | | | |
| 10 on | 0.0 | 0.0 | 0.0 | 0.0 | 0.0 | 0.0 |
| 20 on | 0.0 | 0.2 | 0.0 | 0.0 | 0.0 | 0.0 |
| 32 on | 42.3 | 11.6 | 12.9 | 11.4 | 0.4 | 25.7 |
| 48 on | 54.9 | 59.0 | 49.0 | 47.3 | 45.6 | 67.0 |
| 60 on | 2.0 | 20.8 | 27.7 | 32.7 | 33.5 | 5.6 |
| 80 on | 2.0 | 8.4 | 10.1 | 8.6 | 13.4 | 0.5 |
| 80 pass | 0.0 | 0.0 | 0.3 | 0.0 | 7.1 | 0.5 |
| Particle size distribution B (% by weight) | 59.4 | 70.2 | 85.7 | 86.6 | 80.3 | 70.6 |
| Average particle size after granulation (μm) | 470 | 370 | 350 | 330 | 290 | 430 |
| Angle of repose (degree) | 38 | 38 | 36 | 38 | 39 | 36 |
| Z value | 80 | 94 | 93 | 85 | 80 | 68 |
| Surface roughness (μm) | 1.9 | 1.6 | 1.5 | 1.5 | 1.4 | 1.9 |

In the column of the particle size distribution of Tables 1 and 2, 10 on, 20 on, 32 on, 48 on, 60 on and 80 on indicate the percentages of particles remaining on the 10 mesh, 20 mesh, 32 mesh, 48 mesh, 60 mesh and 80 mesh sieves, respectively. And, 60 pass and 80 pass represent the percentage of the particles passed through the 60 mesh sieve and 80 mesh sieve, respectively.

As is evident from the results in Table 1, the filler-containing PTFE granular powder obtained by the preparation process of the present invention has a large apparent density, particularly a small particle size, a narrow particle size distribution and a superior flowability in spite of the small particle size and a small angle of repose. Also, the molded article obtained from the granular powder is superior in tensile strength and elongation and the surface roughness thereof is low.

Also, it is recognized that the preparation process of the present invention not only can provide a filler-containing PTFE granular powder having excellent physical properties mentioned above, but also requires no complicated step of pre-mixing the PTFE powder and the filler and can control the average particle size and the particle size distribution of the filler-containing PTFE granular powder by an addition amount of the surfactant.

FIGS. 2 is an optical microscopic photograph of Example 1 and FIG. 3 is an optical microscopic photograph of Example 2, which show the structure of the particle in the filler-containing PTFE granular powders of the present invention. FIGS. 4 to 7 are optical microscopic photographs which show the structure of the particle in the filler-containing PTFE granular powders obtained according to a conventional granulation process without using a surfactant.

As is evident from these Figures, though the particles in the filler-containing PTFE granular powder of the present invention are almost spherical, the particles in the filler-containing PTFE granular powder obtained according to the above-mentioned conventional granulation process is not spherical.

The reason why the filler-containing PTFE granular powder of the present invention is superior in powder flowability in spite of the small average particle size seems that, for example, the shape of the particles are almost spherical as mentioned above.

INDUSTRIAL APPLICABILITY

The filler-containing PTFE granular powder of the present invention which contains the almost spherical particles in its major portion has a large apparent density, a small average particle size, a narrow particle size distribution and a small angle of repose and is superior in powder flowability in spite of the small particle size. And, the molded product obtained from the granular powder is superior in tensile strength and elongation and has a low surface roughness.

Also, the preparation process of the present invention not only can provide the filler-containing PTFE granular powder having superior physical properties as mentioned above but also requires no complicated step of pre-mixing the PTFE powder and the filler and, particularly, can control the average particle size and particle size distribution by the amount of the surfactant, and can give the granular powder having a narrow particle size distribution at low cost.

We claim:

1. A process for preparing a filler-containing polytetrafluoroethylene granular powder by granulation of a mixture of a polytetrafluoroethylene powder prepared through suspension polymerization and a filler in water with stirring; characterized in that the polytetrafluoroethylene powder and the filler are poured separately in water without being pre-mixed, are mixed with stirring in the presence of a surfactant to give a slurry and then are granulated with stirring in the presence of an organic liquid which forms liquid-liquid interface with water and that the granular powder has an average particle size of not more than 500 μm and an apparent density of not lower than 0.6 g/cm³.

2. A process for preparing a filler-containing polytetrafluoroethylene granular powder by granulation of a mixture of a polytetrafluoroethylene powder prepared through suspension polymerization and a filler in water with stirring; characterized in that the polytetrafluoroethylene powder is poured in water and stirred in the presence of a surfactant to give a slurry and then after the filler is added and mixed to the slurry, the mixture is granulated with stirring in the presence of an organic liquid which forms liquid-liquid interface with water and that the granular powder has an average particle size of not more than 500 μm and an apparent density of not lower than 0.6 g/cm³.

3. A process for preparing a filler-containing polytetrafluoroethylene granular powder by granulation of a mixture of a polytetrafluoroethylene powder prepared through suspension polymerization and a filler in water with stirring; characterized in that a water-containing powder of polytetrafluoroethylene after polymerized is wet-pulverized without being subjected to drying, poured in water, stirred in the presence of a surfactant to give a slurry and then after the filler is added and mixed to the slurry, is granulated with stirring in the presence of an organic liquid which forms liquid-liquid interface with water and that the granular powder has an average particle size of not more than 500 μm and an apparent density of not lower than 0.6 g/cm$^3$.

4. The process for preparing a filler-containing polytetrafluoroethylene granular powder of claim 1, wherein an amount of the surfactant is 0.01 to 5% by weight to a total amount of the polytetrafluoroethylene powder and filler.

5. The process for preparing a filler-containing polytetrafluoroethylene granular powder of claim 1, wherein the polytetrafluoroethylene is a modified polytetrafluoroethylene obtained by copolymerizing 99 to 99.999% by mole of tetrafluoroethylene and 1 to 0.001% by mole of a perfluorovinylether.

6. The filler-containing polytetrafluoroethylene granular powder of claim 1, wherein the granular powder has a powder flowability of not less than 6 times under 21B method.

7. The filler-containing polytetrafluoroethylene granular powder of claim 1, wherein the granular powder has an angle of repose of not larger than 40 degrees.

8. The process for preparing a filler-containing polytetrafluoroethylene granular powder of claim 2, wherein an μmount of the surfactant is 0.01 to 5% by weight to a total amount of the polytetrafluoroethylene powder and filler.

9. The process for preparing a filler-containing polytetrafluoroethylene granular powder of claim 3, wherein an amount of the surfactant is 0.01 to 5% by weight to a total amount of the polytetrafluoroethylene powder and filler.

10. The process for preparing a filler-containing polytetrafluoroethylene granular powder of claim 2, wherein the polytetrafluoroethylene is a modified polytetrafluoroethylene obtained by copolymerizing 99 to 99.999% by mole of tetrafluoroethylene and 1 to 0.001% by mole of a perfluorovinylether.

11. The process for preparing a filler-containing polytetrafluoroethylene granular powder of claim 3, wherein the polytetrafluoroethylene is a modified polytetrafluoroethylene obtained by copolymerizing 99 to 99.999% by mole of tetrafluoroethylene and 1 to 0.001% by mole of a perfluorovinylether.

12. The filler-containing polytetrafluoroethylene granular powder of claim 2, wherein the granular powder has a powder flowability of not less than 6 times under 21B method.

13. The filler-containing polytetrafluoroethylene granular powder of claim 3, wherein the granular powder has a powder flowability of not less than 6 times under 21B method.

14. The filler-containing polytetrafluoroethylene granular powder of claim 2, wherein the granular powder has an angle of repose of not larger than 40 degrees.

15. The filler-containing polytetrafluoroethylene granular powder of claim 3, wherein the granular powder has an angle of repose of not larger than 40 degrees.

* * * * *